United States Patent
Fan et al.

(10) Patent No.: US 10,880,816 B2
(45) Date of Patent: Dec. 29, 2020

(54) ON-DEMAND REQUEST FOR SYSTEM INFORMATION

(71) Applicant: Telefonaktiebolaget LM Ericsson (publ), Stockholm (SE)

(72) Inventors: Rui Fan, Beijing (CN); Jinhua Liu, Beijing (CN); Pål Frenger, Linköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/669,436

(22) Filed: Oct. 30, 2019

(65) Prior Publication Data

US 2020/0068478 A1 Feb. 27, 2020

Related U.S. Application Data

(63) Continuation of application No. 15/568,431, filed as application No. PCT/CN2017/101576 on Sep. 13, 2017, now Pat. No. 10,512,027.

(30) Foreign Application Priority Data

Jan. 4, 2017 (WO) ................ PCT/CN2017/070130

(51) Int. Cl.
*H04W 48/08* (2009.01)
*H04W 72/04* (2009.01)
*H04W 48/14* (2009.01)

(52) U.S. Cl.
CPC ........... *H04W 48/08* (2013.01); *H04W 48/14* (2013.01); *H04W 72/0446* (2013.01); *Y02D 30/70* (2020.08)

(58) Field of Classification Search
CPC .. H04W 48/08; H04W 48/14; H04W 72/0446
See application file for complete search history.

(56) References Cited

U.S. PATENT DOCUMENTS 10,455,621 B2 10/2019 Agiwal et al.
2012/0106516 A1 5/2012 Jung et al.
(Continued)

FOREIGN PATENT DOCUMENTS

CN 101123818 A 2/2008
CN 101217689 A 7/2008
(Continued)

OTHER PUBLICATIONS

3GPP TS 25.331 V13.5.0 (Dec. 2016), "3rd Generation Partnership Project; Technical Specification Group Radio Access Network; Radio Resource Control (RRC); Protocol specification (Release 13)," Dec. 2016, 2271 pages.
(Continued)

*Primary Examiner* — Melvin C Marcelo
(74) *Attorney, Agent, or Firm* — NDWE LLP (57) ABSTRACT

A method for requesting system information. The method comprises transmitting a request for at least one system information block group, each of which comprises one or more system information blocks, from a user terminal to a network node. The one or more system information blocks is/are grouped according to a feature of the one or more system information blocks. The method may further comprise receiving one or more system information block groups from the network node. The one or more system information block groups may comprise the at least one system information block group.

20 Claims, 2 Drawing Sheets

(56) References Cited

U.S. PATENT DOCUMENTS

| | | | |
|---|---|---|---|
| 2013/0039248 | A1 | 2/2013 | Koskinen et al. |
| 2015/0351011 | A1 | 12/2015 | Shukla et al. |
| 2018/0167918 | A1 | 6/2018 | Ishii |
| 2019/0069220 | A1 | 2/2019 | Kim |
| 2019/0174554 | A1 | 6/2019 | Deenoo et al. |

FOREIGN PATENT DOCUMENTS

| | | |
|---|---|---|
| CN | 101542915 A | 9/2009 |
| EP | 2903349 A1 | 8/2015 |
| EP | 3413632 A1 | 12/2018 |
| EP | 3454620 A1 | 3/2019 |
| GB | 2506389 A | 4/2014 |
| JP | 2014-525691 A | 9/2014 |
| KR | 10-2009-0061058 A | 6/2009 |
| KR | 10-2011-0004330 A | 1/2011 |
| RU | 2591664 C2 | 7/2016 |

OTHER PUBLICATIONS

Examination Report from foreign counterpart Bangladesh Patent Application No. 256/2017/4370, dated Dec. 24, 2018, 1 page.
Extended European Search Report for Application No. 17784155.8, dated Apr. 11, 2019, 7 pages.
International Search Report and Written Opinion for Application No. PCT/CN2017/101576, dated Nov. 30, 2017, 11 pages.
Non-Final Office Action from U.S. Appl. No. 15/568,431, dated Apr. 4, 2019, 18 pages.
Notice of Allowance from U.S. Appl. No. 15/568,431, dated Jul. 30, 2019, 9 pages.
Samsung., "On Demand SI Delivery: Signaling Aspects," 3GPP TSG-RAN WG2 #96, R2-167563, Nov. 14-18, 2016, 3 pages.
Communication pursuant to Article 94(3) EPC received for European Patent Application No. 17784155.8, dated Jul. 22, 2019, 4 pages.
International Preliminary Report on Patentability received for PCT Patent Application No. PCT/CN2017/10157, dated Jul. 22, 2019, 4 pages.
Preliminary Search Report received for Moroccan Patent Application No. 46151, completed on Oct. 2, 2019, 4 pages of Original Document Only.
Communication pursuant to Article 94(3) EPC, EP App. No. 17784155.8, dated Dec. 3, 2019, 4 pages.
Office Action, RU Appl. No. 2019120694, dated Apr. 6, 2020, 16 pages (7 pages of English Translation and 9 pages of Original Document).
Intention to Grant a Patent, EP App No. 17784155.8, dated Jun. 2, 2020, 70 pages.
Office Action, KR App. No. 10-2019-7018968, dated Jun. 29, 2020, 11 pages (6 pages of English Translation and 5 pages of Original Document).
Written Opinion, SG App. No. 11201904989T, dated Jul. 20, 2020, 6 pages.
Office Action, CN App. No. 201780001618.1, dated Aug. 4, 2020, 14 pages (8 pages of English Translation and 6 pages of Original Document).
Catt, "On-demand system information delivery mechanism", 3GPP TSG-RAN WG2 Meeting #96, R2-167960, Nov. 14-18, 2016, 6 pages.
Decision to grant a European patent pursuant to Article 97(1) EPC, EP App. No. 17784155.8, dated Oct. 8, 2020, 2 pages.
European Search Report and Search Opinion, EP App. No. 20182863.9 dated Oct. 16, 2020, 8 pages.
InterDigital Communications, "Acquisition of Other-SI", 3GPP TSG-RAN WG2 #95-BIS, R2-168464, Nov. 14-18, 2016, 6 pages.
MediaTek Inc., "Stored System Information for OSI", 3GPP Tsg-RAN2 #96 Meeting, R2-168148, Nov. 14-18, 2016, 6 pages.
Notice of Reasons for Rejection, JP App. No. 2019-536095, dated Sep. 15, 2020,6 pages (3 pages of English Translation and 3 pages of Original Document).
Office Action, CA App. No. 3,049,041 dated Oct. 22, 2020, 4 pages.
Oppo, "Discussion on Issues of Other Sis", 3GPP TSG-RAN2 Meeting #96, R2-167480, Nov. 14-18, 2016, 6 pages.
Sharp, MTI, "System Information Areas for Other Si", 3GPP TSG RAN WG2 Meeting #96, R2-167640, Nov. 14-18, 2016, 6 pages.

ON-DEMAND REQUEST FOR SYSTEM INFORMATION

CROSS-REFERENCE TO RELATED APPLICATIONS

This application is a continuation of application Ser. No. 15/568,431, filed Oct. 20, 2017, which is a National stage of International Application No. PCT/CN2017/101576, filed Sep. 13, 2017, which claims priority to International Application No. PCT/CN2017/070130, filed Jan. 4, 2017, which are all hereby incorporated by reference.

TECHNICAL FIELD

The present disclosure generally relates to communications, and more specifically, relates to wireless communications.

BACKGROUND ART

In a communication network such as Long Term Evolution (LTE) system, system information (SI) is important as it can provide necessary information to a user terminal, such as a user equipment (UE) or a wireless device, for linking with the communication network. In new radio (NR), SI may be classified into minimum SI and other SI Minimum SI is the SI that a user terminal must read before it can know how to access the network. Other SI is the SI not within minimum SI. SI may be transmitted to the user terminal in a master information block (MIB) and/or a system information block (SIB). For example, minimum SI may correspond to MIB, SIB1 and SIB2 in LTE. Other SI may correspond to those remaining SIBs. Since other SI is not necessary for a user terminal to access network, in order to achieve energy efficiency, it may be desirable that the SI may be requested on demand.

SUMMARY OF THE INVENTION

This summary is provided to introduce a selection of concepts in a simplified form that are further described below in detailed description. This summary is not intended to identify key features or essential features of the claimed subject matter, nor is it intended to be used to limit the scope of the claimed subject matter.

The present disclosure proposes a solution of on-demand request for SI, which may enable a communication network to transmit or broadcast SI, such as other SI as mentioned previously, according to a request for the SI from a user terminal.

According to a first aspect of the present disclosure, there is provided a method for requesting SI, which may be performed at an apparatus such as a user terminal. The method may comprise transmitting a request for at least one SIB group, each of which comprises one or more SIBs, from a user terminal to a network node. The one or more SIBs may be grouped according to a feature of the one or more SIBs. The method may further comprise receiving one or more SIB groups from the network node. The one or more SIB groups may comprise the at least one SIB group.

In an exemplary embodiment, the method according to the first aspect of the present disclosure may further comprise receiving notification information from the network node. For example, transmission of the at least one SIB group may be predefined or derived based at least partly on the notification information.

In an exemplary embodiment, the method according to the first aspect of the present disclosure may further comprise receiving an indicator from the network node. The indicator may indicate at least one of: which SIB group is being transmitted from the network node, and which SIB group is scheduled to be transmitted from the network node.

According to a second aspect of the present disclosure, there is provided an apparatus for requesting SI. The apparatus may comprise at least one processor and at least one memory comprising computer program code. The at least one memory and the computer program code may be configured to, with the at least one processor, cause the apparatus at least to perform any step of the method according to the first aspect of the present disclosure.

According to a third aspect of the present disclosure, there is provided a computer program product comprising a computer-readable medium bearing computer program codes embodied therein for use with a computer. The computer program codes may comprise code for performing any step of the method according to the first aspect of the present disclosure.

According to a fourth aspect of the present disclosure, there is provided an apparatus for requesting SI. The apparatus may comprise a transmitting module and a receiving module. In accordance with some exemplary embodiments, the transmitting module may be operable to carry out at least the transmitting step of the method according to the first aspect of the present disclosure. The receiving module may be operable to carry out at least the receiving step of the method according to the first aspect of the present disclosure.

In accordance with an exemplary embodiment, the transmission of the request may comprise transmitting a preamble for indicating the at least one SIB group.

In accordance with an exemplary embodiment, the transmission of the request may comprise: selecting, from a plurality of preambles, a preamble associated with the at least one SIB group; and transmitting the request to the network node. The request may include the selected preamble.

In accordance with an exemplary embodiment, the at least one SIB group may be indicated by transmission timing of the preamble.

In accordance with an exemplary embodiment, the transmission of the request may comprise transmitting the request to the network node in accordance with a selected transmission timing associated with the at least one SIB group.

According to a fifth aspect of the present disclosure, there is provided a method for transmission of SI, which may be performed at an apparatus such as a network node. The method may comprise receiving a request for at least one SIB group, each of which comprises one or more SIBs, from a user terminal to a network node. The one or more SIBs may be grouped according to a feature of the one or more SIBs. The method may further comprise transmitting one or more SIB groups from the network node. The one or more SIB groups may comprise the at least one SIB group.

In accordance with an exemplary embodiment, the method according to the fifth aspect of the present disclosure may further comprise: transmitting notification information to the user terminal. For example, transmission of the at least one SIB group may be predefined or derived based at least partly on the notification information.

In accordance with an exemplary embodiment, the method according to the fifth aspect of the present disclosure may further comprise transmitting an indicator from the network node. The indicator may indicate at least one of:

which SIB group is being transmitted from the network node, and which SIB group is scheduled to be transmitted from the network node.

According to a sixth aspect of the present disclosure, there is provided an apparatus for transmission of SI. The apparatus may comprise at least one processor and at least one memory comprising computer program code. The at least one memory and the computer program code may be configured to, with the at least one processor, cause the apparatus at least to perform any step of the method according to the fifth aspect of the present disclosure.

According to a seventh aspect of the present disclosure, there is provided a computer program product comprising a computer-readable medium bearing computer program codes embodied therein for use with a computer. The computer program codes may comprise code for performing any step of the method according to the fifth aspect of the present disclosure.

According to an eighth aspect of the present disclosure, there is provided an apparatus for transmission of SI. The apparatus may comprise a receiving module and a transmitting module. In accordance with some exemplary embodiments, the receiving module may be operable to carry out at least the receiving step of the method according to the fifth aspect of the present disclosure. The transmitting module may be operable to carry out at least the transmitting step of the method according to the fifth aspect of the present disclosure.

In accordance with an exemplary embodiment, the reception of the request may comprise receiving a preamble for indicating the at least one SIB group.

In accordance with an exemplary embodiment, the reception of the request may comprise receiving the preamble which was selected from a plurality of preambles. The selected preamble may be associated with the at least one SIB group.

In accordance with an exemplary embodiment, the at least one SIB group may be indicated by transmission timing of the preamble.

In accordance with an exemplary embodiment, the reception of the request may comprise receiving the request from the user terminal in accordance with a selected transmission timing associated with the at least one SIB group.

In accordance with an exemplary embodiment, the notification information may be included in minimum SI.

In accordance with an exemplary embodiment, the notification information may indicate a correspondence between all of preambles and SIB groups.

In accordance with some exemplary embodiments, the feature of the one or more SIBs may comprise at least one of functionality and periodicity of the one or more SIBs.

In accordance with some exemplary embodiments, the request for the at least one SIB group may comprise a preamble for indicating the at least one SIB group. The at least one SIB group may be indicated by or associated with a preamble sequence or the transmission timing of the preamble. For example, the indication of the at least one SIB group by the preamble may be predefined or derived based at least partly on the notification information from the network node.

In accordance with some exemplary embodiments, the one or more SIB groups from the network node may further comprise at least another SIB group which is not requested by the user terminal.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

The embodiments of the present disclosure are described in detail with reference to the accompanying drawings. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

In a wireless network such as new radio (NR), SI may be broadcasted by a network node, such as a base station or a next generation Node B (gNB), in a cell to all user terminals monitoring the specific cell. It is important for a user terminal to maintain the required SI because otherwise it cannot interact with the network in an interoperable manner. As mentioned previously, minimum SI in NR corresponds to MIB, SIB1 and SIB2 in LTE. There are some assumptions about how to request other SI from the network. For example, some messages like MSG1 and/or MSG3 may be used to carry a request for other SI.

If using one preamble of MSG1 to carry a request for all other SI, then it may result in unnecessary transmission of some undesired other SI. This is because there is quite a lot of other SI in the system and the network may have to broadcast all other SI when it receives such preamble to request other SI. However, a user terminal may not need all the other SI.

If using MSG3 to request other SI, since there could be contention during a random access procedure, the network may not be able to detect MSG3 reliably in time. In addition, there are additional overhead and delay because more messages are transmitted for requesting other SI.

The present disclosure proposes a solution of on-demand request for SI. In the proposed solution, one or more SIBs may be classified into a SIB group according to their relevance or correlation. When a user terminal wants to request some specific SI, it can request from a network node a SIB group in which the specific SI is contained. Then, the network node can know which SIB group the user terminal actually needs, and broadcast the requested SIB group accordingly. In this way, the network node can transmit or broadcast the SI to the user terminal with more energy efficiency. On the other hand, transmission resources and energy also can be saved from the view point of the user terminal, since it does not need to send additional SI request if another user terminal has already sent a request for the same SI as required by the user terminal.

Figure 1:
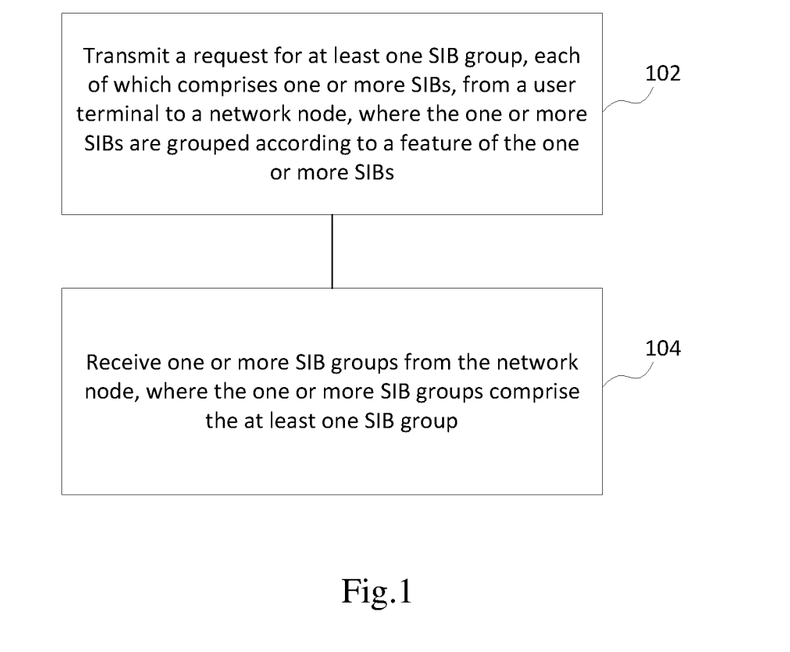
FIG. 1 is a flowchart illustrating a method for requesting SI according to an embodiment of the present disclosure.

FIG. 1 is a flowchart illustrating a method for requesting SI according to an embodiment of the present disclosure. The method illustrated in FIG. 1 may be performed by an apparatus implemented at a user terminal or communicatively coupled to a user terminal. In accordance with the exemplary embodiment, the user terminal may comprise a UE, a mobile station, a wireless device, a personal digital assistant (PDA), a laptop computer, a tablet computer, a smart phone, a portable device, or any other user device being capable of participating in communication of a wireless network.

According to the exemplary method illustrated in FIG. 1, a request for at least one SIB group, each of which comprises one or more SIBs, may be transmitted from a user terminal to a network node, as shown in block 102. In the exemplary embodiment, the one or more SIBs may be grouped or classified according to a feature of the one or more SIBs. It will be realized that the SI corresponding to the SIB mentioned here may comprise other SI than minimum SI in the context of NR. It is noted that the terms of "SI" and "SIB" used herein and the exemplary illustration of grouping of one or more SIBs are not limited to NR and LTE. The proposed methods, apparatus and related products herein may also be applicable to other suitable network environments, although some exemplary embodiments are described with respect to NR and LTE. As described previously, minimum SI corresponds to MIB, SIB1 and SIB2 in LTE, and accordingly other SI corresponds to SIB3 until SIB21. The feature of the one or more SIBs may be learned from the SIB definition in LTE. For example, the feature of the one or more SIBs may comprise at least one of functionality and periodicity of the SIBs. However, other suitable rules may also be expected to be applicable for learning more features of SIBs.

Table 1 exemplarily shows the functional description of some SIBs in LTE. It can be seen from Table 1 that the SIBs carrying SI are not fully independent to each other. For example, SIB3 to SIB8 are all related to how to do cell reselection, although each SIB has different responsibility. Therefore, SIB3 to SIB8 can be grouped together. For SIB10 to SIB12, these SIBs are all related to warning and alert. Therefore, SIB10 to SIB12 can be group together. For SIB18 to SIB19, the SIBs are both related to device-to-device (D2D) sidelink communication. Accordingly, SIB18 to SIB19 can be grouped together. The remaining SIBs can be grouped together. Thus, the SIBs listed in Table 1 may be classified into four groups.

TABLE 1

| SIB | Description |
|---|---|
| SIB3 | Parameters required for intra-frequency, inter-frequency and I-RAT cell re-selections |
| SIB4 | Information regarding INTRA-frequency neighboring cells (E-UTRA) |
| SIB5 | Information regarding INTER-frequency neighboring cells (E-UTRA) |
| SIB6 | Information for re-selection to INTER-RAT (UTRAN cells) |
| SIB7 | Information for re-selection to INTER-RAT (GERAN cells) |
| SIB8 | Information for re-selection to INTER-RAT (CDMA2000) |
| ... | ... |
| SIB10 | ETWS (Earthquake and Tsunami Warning System) information (Primary notification) |

TABLE 1-continued

| SIB | Description |
|---|---|
| SIB11 | ETWS (Earthquake and Tsunami Warning System) information (Secondary notification) |
| SIB12 | Commercial Mobile Alert Service (CMAS) information. |
| ... | ... |
| SIB18 | Sidelink UE information procedure, sidelink communication related resource configuration information |
| SIB19 | Sidelink UE information procedure, sidelink discovery related resource configuration information |
| ... | ... |

It can be seen that different SIBs and the SI thereof may be grouped according to their functionalities. Optionally, the SIBs may be classified into more or less groups than four groups. For example, since the transmission of SIBs related to warning and alert is triggered by the network instead of by a user terminal, the SI associated with SIB10 to SIB12 does not need to be requested by the user terminal at all. Then in total there are three SIB groups to be requested. Other ways to group these SIBs are also possible. For example, the SIBs related to cell reselection may be classified into one group, while all others may be classified into another group.

Another feature of SIBs which may be used to classify the SIBs is periodicity. For example, SIBs with the same or similar transmission periodicity may be grouped together. Use LTE SIB transmission periodicity as an example, where the SIBs each with periodicity of 80 ms, 160 ms, 320 ms, 640 ms, 1280 ms, 2560 ms and 5120 ms may be classified into seven SIB groups. Alternatively, the SIBs may be classified into three SIB groups with the first group comprising SIBs with periodicities of 80 ms, 160 ms, the second group comprising SIBs with periodicities of 320 ms, 640 ms, and the third group comprising SIBs with periodicities of 1280 ms, 2560 ms, 5120 ms. It will be realized that one or more SIBs may be classified into the desired number of groups according to the periodicity of SIBs.

In accordance with the exemplary method illustrated in FIG. 1, the transmission of the request for the at least one SIB group may comprise transmitting a preamble for indicating the at least one SIB group.

In an exemplary embodiment, the transmission of the request may comprise selecting, from a plurality of preambles, a preamble associated with the at least one SIB group; and transmitting the request to the network node. The request may include the selected preamble.

In an exemplary embodiment, the at least one SIB group may be indicated by transmission timing of the preamble. Optionally, the transmission of the request may comprise transmitting the request to the network node in accordance with a selected transmission timing associated with the at least one SIB group.

In an exemplary embodiment, the at least one SIB group may be associated with a preamble (also referred to as a sequence of the preamble or a preamble sequence for ease of description) or the selected transmission timing of the preamble. Thus, the user terminal can selectively request the required SIB group from the network node.

In an exemplary embodiment, selective requests for SIB groups may be transmitted from the user terminal by using different preamble sequences, which may be differentiated by indexes of the preambles. One preamble sequence may correspond to a predetermined combination of SIB groups. Take 3 preambles as an example. In alternative I, preambles 1 to 3 may be used to indicate SIB groups 1 to 3, respectively, where SIB group 1 is related to cell reselection, SIB group 2 is related to sidelink communication, and SIB group 3 comprises the remaining one or more SIBs. According to this alternative, a user terminal needing multiple SIB groups (for example, comprising SIB groups 1 and 2) may be required to send multiple SIB group requests (for example, comprising preambles 1 and 2) to a network node.

It will be realized that the usage of multiple preambles can be in different ways. For example, in alternative II, preambles 1 to 3 may be used to indicate SIB group 1, SIB groups 1+2, and SIB groups 1+2+3, respectively. According to this alternative, a user terminal can always select a corresponding preamble to get all desired SIB groups. Compared to alternative I, alternative II may save the preamble resource/transmission but the probability to transmit the undesired SI is higher than alternative I.

Thus, when SIB groups in the network are indicated by using different preambles, the user terminal can send the corresponding preamble to the network node if the user terminal wants to request SI from at least one of the SIB groups. When the network node detects such preamble, it can therefore only transmit or broadcast SI within the indicated SIB groups according to the detected preamble.

In accordance with the exemplary method illustrated in FIG. 1, the user terminal may receive notification information transmitted from the network node. In this case, transmission of the at least one SIB group may be predefined or derived based at least partly on the notification information. Optionally, the notification information may be included in minimum SI.

In an exemplary embodiment, the notification information may indicate a correspondence between all of preambles and SIB groups. Optionally, the correspondence between the at least one SIB group and the associated preamble or the indication of the at least one SIB group by the preamble may be predefined or derived based at least partly on the notification information from the network node. For example, the preambles which are used to request on-demand transmission of SI carried by one or more SIBs can be predefined according to a specified rule known by the user terminal and the network node.

In an exemplary embodiment, if the correspondence between preambles and SIB groups is informed in minimum SI, the minimum SI can indicate only one preamble for one SIB group, while there is a specified rule for the user terminal to derive other preambles for other SIB groups. For example, it is assumed that the specified rule is that all the preambles for requesting SIB groups are with consecutive indexes, and each preamble with an index increased by one indicates one or more SIB group. As such, for alternative II as mentioned previously, if it is informed in the minimum SI that a preamble with index 'n' is used to indicate SIB group 1, then according to the specified rule, the user terminal may know that a preamble with index 'n+1' is used to indicate SIB groups 1+2, and a preamble with index 'n+2' is used to indicate SIB groups 1+2+3. It will be appreciated that other suitable rules also may be applicable to determine preambles for selective request and transmission of SI. For example, the preambles for requesting SIB groups may be with inconsecutive indexes, and/or the correspondence between all of preambles and SIB groups may be informed in the minimum SI from the network node.

In another exemplary embodiment, selective requests for SIB groups may be transmitted from the user terminal by using different preamble timing. In this embodiment, only one preamble may be used to request SIB group transmission from the network node, but the timing at which the preamble is sent can be utilized to determine which SIB group is requested. Therefore, compared with the embodiment where different preambles are used to indicate multiple SIB groups, using different transmission timing of one preamble to indicate multiple SIB groups may save transmission resources.

Assuming there are three SIB groups, including SIB group A with periodicities of 80 ms, 160 ms, SIB group B with periodicities of 320 ms, 640 ms, and SIB group C with periodicities of 1280 ms, 2560 ms, 5120 ms. The respective minimum periodicities of SIB groups A, B and C are 80 ms, 320 ms and 1280 ms, respectively. Then the timing at which a SIB group is requested by sending a preamble determines which SIB group is requested. In an exemplary embodiment, the requested SIB group may be determined according to whether the frame corresponding to the preamble sent by the user terminal has an integer multiple period of the minimum periodicity of the SIB group. As a further rule, if the period of that frame is an integer multiple of the minimum periodicities of several SIB groups, then the SIB group with the largest periodicity (or alternatively the SIB group with the smallest periodicity) may be determined as the requested SIB group. In another exemplary embodiment, the requested SIB group may be determined according to the frame corresponding to the preamble sent by the user terminal and the latest next frame in which SI can be transmitted or broadcasted. In this embodiment, the frame corresponding to the preamble may have a period which is not an integer multiple of the minimum periodicity of the SIB group.

Use the LTE frame as an example, where the frame length is 10 ms. If the number of the frame corresponding to the preamble is 24, then the period of the frame is 240 ms, which is an integer multiple of the minimum periodicity 80 ms of SIB group A. This means that the user terminal wants to request SIB group A. Similarly, if the number of the frame corresponding to the preamble is 96, then the period of the frame is 960 ms, which is an integer multiple of the minimum periodicity 80 ms of SIB group A and the minimum periodicity 320 ms of SIB group B. This means that the user terminal wants to request both SIB group A and SIB group B but not SIB group C. Or as the further rule, it is SIB group B that is requested instead of SIB group A plus B, because the minimum periodicity of SIB group B is larger than that of SIB group A. Alternatively, if the frame number corresponding to the preamble is 22, then the number of the latest next frame to transmit or broadcast SI is 24, according to a predefined criterion. Since the period of this latest next frame is 240 ms, which is an integer multiple of the minimum periodicity of SIB group A, this could mean that the user terminal wants to request just SIB group A.

Thus, when the user terminal wants to request a certain SIB group, it can send a preamble as a request to the network node at the specific timing or frame. When the network node detects this preamble, it can determine which SIB group the user terminal wants to request, according to the transmission timing of the preamble. Accordingly, the network node can only transmit or broadcast SI within the corresponding SIB group in the network. This can eliminate unnecessary SI transmissions in the network.

Referring back to FIG. 1, the user terminal may receive one or more SIB groups from the network node, as shown in block 104. The one or more SIB groups may comprise the at least one SIB group requested by the user terminal in block 102. Optionally, the one or more SIB groups may further comprise at least another SIB group which is not requested by the user terminal. For example, preamble 3 is used to indicate SIB groups 1+2+3, as described previously in alternative II. If the user terminal wants to obtain SI within SIB group 1, then the user terminal may also obtain SIB groups 2 and 3 in addition to SIB group 1, when using preamble 3 to request SIB group 1 from the network node. Apparently, SIB groups 2 and 3 are not actually needed by the user terminal. In another example, since the network node may transmit or broadcast multiple SIB groups requested by different user terminals in the network, the user terminal may receive one or more SIB groups requested by other user terminals.

Figure 2:
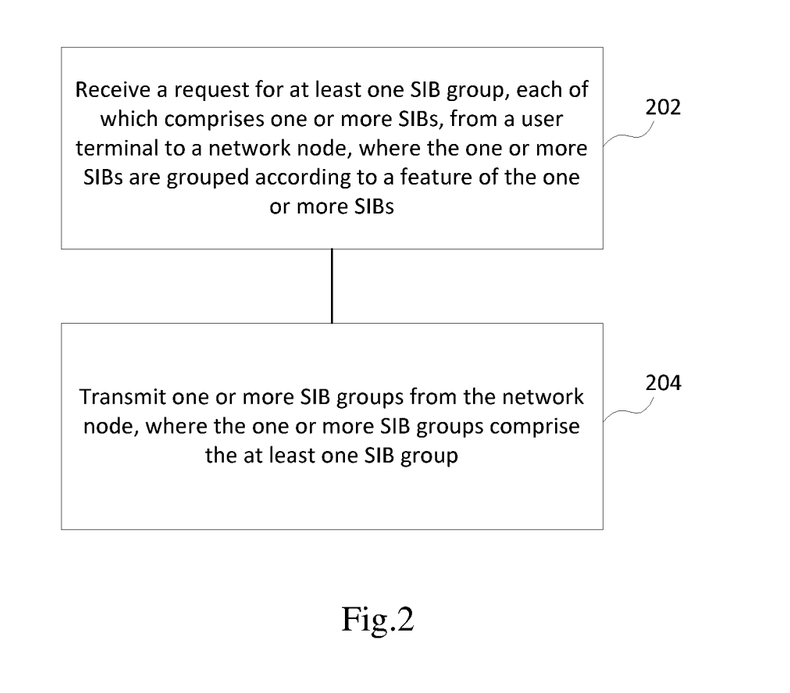
FIG. 2 is a flowchart illustrating a method for transmission of SI according to another embodiment of the present disclosure.

FIG. 2 is a flowchart illustrating a method for transmission of SI according to another embodiment of the present disclosure. The method illustrated in FIG. 2 may be performed by an apparatus implemented at a network node or communicatively coupled to a network node. In accordance with the exemplary embodiment, the network node may comprise an evolved Node B (eNB), a gNB, an access point (AP), a base station (BS), a communication node, a control center, a relay station, a repeater, or any other network device being capable of participating in communication of a wireless network.

Corresponding to steps of the exemplary method for requesting SI performed by a user terminal as illustrated in FIG. 1, the network node may receive a request for at least one SIB group, each of which comprises one or more SIBs, from the user terminal as shown in block 202. As described in connection with FIG. 1, the one or more SIBs may be grouped according to a feature of the one or more SIBs, such as functionality and/or periodicity of the one or more SIBs. In block 204, one or more SIB groups may be transmitted or broadcasted from the network node. The one or more SIB groups may comprise the at least one SIB group requested by the user terminal. Optionally, the one or more SIB groups may further comprise at least another SIB group requested by other user terminal.

In an exemplary embodiment, the reception of the request may comprise receiving a preamble for indicating the at least one SIB group. The preamble may be selected from a plurality of preambles and associated with the at least one SIB group. Optionally, the at least one SIB group may be indicated by transmission timing of the preamble. Accordingly, the reception of the request may comprise receiving the request from the user terminal in accordance with a selected transmission timing associated with the at least one SIB group.

As mentioned previously, the network node may inform the user terminal of the correspondence between a SIB group and a preamble used to indicate the SIB group, so that the user terminal can selectively request transmission of group based SIB(s). In order to make the selective transmission of group based SIB(s) more effective, the network node may provide some scheduling information of group based SIB(s) in a cell served by the network node. Then, the user terminal can detect from such scheduling information whether the required SI is being broadcasted or not.

According to an exemplary embodiment, the network node may transmit an indicator to indicate at least one of: which SIB group is being transmitted or broadcasted from the network node, and which SIB group is scheduled to be transmitted or broadcasted from the network node. Correspondingly, the user terminal may receive this indicator (which is also referred to as a group based SIB indicator) from the network node. As such, the user terminal can learn from the indicator whether the required SI is available in the cell served by the network node. For example, if a SIB group containing the required SI is indicated by the indicator from the network node, it is not necessary for the user terminal to transmit a request for this SIB group to the network node.

In an exemplary embodiment, the group based SIB indicator may be provided in minimum SI by the network node for indicating the group based SIB(s) and validity information. For alternative I described previously, two bits may be used as the group based SIB indicator to indicate the SIB group transmission: 00—no transmission of SIB group; 01—transmission of SIB group 1; 10—transmission of SIB group 2; 11—transmission of SIB group 3. Similarly, for alternative II described previously, two bits can be used as the group based SIB indicator to indicate the SIB group transmission: 00—no transmission of SIB group; 01—transmission of SIB group 1; 10—transmission of SIB groups 1+2; 11—transmission of SIB groups 1+2+3.

The user terminal can check the group based SIB indicator in the minimum SI broadcasted by the network node. When the user terminal read such indicator in the minimum SI, it can know which SIB group(s) is now available in the corresponding cell. Then the user terminal can decide if it needs to send a request for a SIB group to the network node. If the group based SIB indicator in the minimum SI indicates that the SIB group is being transmitted/broadcasted or will be transmitted/broadcasted by the network node, which means that the SIB group is available in the cell, the user terminal would not send a corresponding preamble to the network node to request this SIB group.

In a further embodiment, even if the user terminal transmits a SIB group request for at least one SIB group, the network node can override the SIB group request by indicating the transmission of more SIB groups. For example, the network node may combine multiple SIB group requests from either one or multiple user terminals, and determine the transmission of SIB group(s) and the corresponding indicator settings.

The proposed methods as illustrated with respect to FIGS. 1-2 can classify one or more SIBs into a SIB group, and the SIB group or a combination of several SIB groups may be associated with a unique preamble or a unique timing to request a SIB group. When a user terminal wants to request a SIB group, it can according to its actual needs send a distinct preamble or send a preamble at certain timing to a network node to request the corresponding SIB group. The network node can then know which SIB group the user terminal needs, and broadcast it accordingly. In this way, the network node can avoid to transmit the undesired SI to the user terminal.

Thus it can be seen that with grouping of one or more SIBs for on-demand transmission, the network node can only send a specified SIB group instead of all SIB groups, in response to a SIB group request from the user terminal. This may be achieved by using different preambles or different preamble transmission timing. In addition, using a group based SIB indicator to indicate the availability of one or more SIB groups instead of an indicator per SIB, can reduce the number of bits needed in minimum SI quite a lot, thereby making the selective transmission of SI more effective.

The various blocks or information flows shown in FIGS. 1-2 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 3:
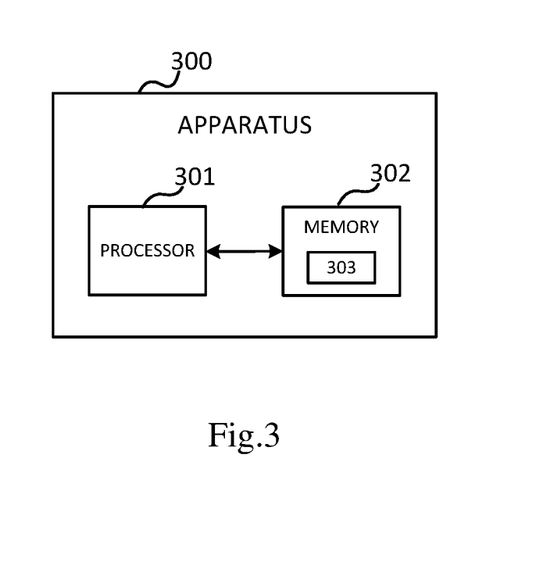
FIG. 3 is a block diagram illustrating an apparatus according to an embodiment of the present disclosure.

FIG. 3 is a block diagram illustrating an apparatus 300 according to some embodiments of the present disclosure. As shown in FIG. 3, the apparatus 300 may comprise at least one processor 301 and at least one memory 302 storing computer program code 303. The at least one memory 302 and the computer program code 303 may be configured to, with the at least one processor 301, cause the apparatus 300 at least to perform any step of the method as described in connection with FIG. 1 or FIG. 2. Alternatively or additionally, the at least one memory 302 and the computer program code 303 may be configured to, with the at least one processor 301, cause the apparatus 300 at least to perform more or less steps to implement the proposed methods.

Figure 4:
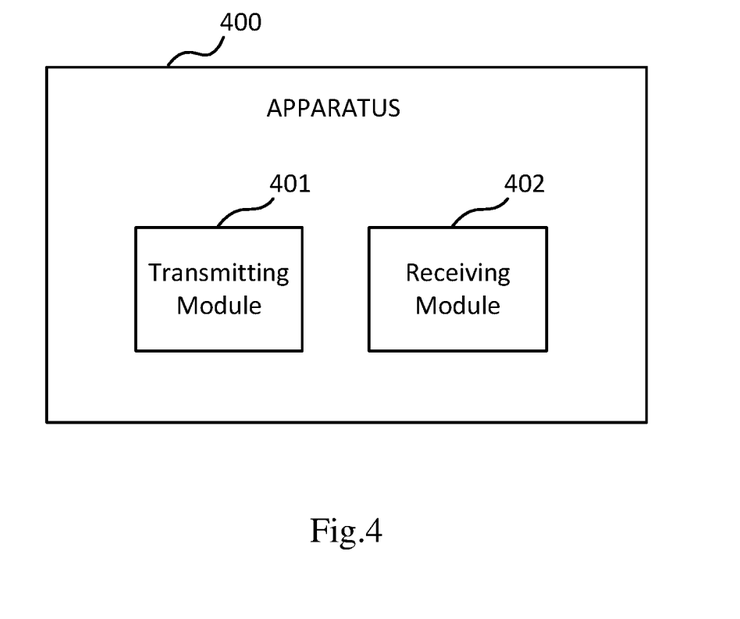
FIG. 4 is a block diagram illustrating another apparatus according to an embodiment of the present disclosure.

FIG. 4 is a block diagram illustrating another apparatus 400 according to some embodiments of the present disclosure. As shown in FIG. 4, the apparatus 400 may comprise a transmitting module 401 and a receiving module 402. In an exemplary embodiment, the apparatus 400 may be implemented at a user terminal. The transmitting module 401 may be operable to carry out the operation in block 102, and the receiving module 402 may be operable to carry out the operation in block 104. In another exemplary embodiment, the apparatus 400 may be implemented at a network node. The receiving module 402 may be operable to carry out the operation in block 202, and the transmitting module 401 may be operable to carry out the operation in block 204. Optionally, the transmitting module 401 and/or the receiving module 402 may be operable to carry out more or less steps to implement the proposed methods.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, Random Access Memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method for requesting system information, comprising:
    transmitting a request for a part of system information blocks among a plurality of system information blocks, from a user terminal to a network node, wherein the part of the system information blocks are grouped according to a feature of the plurality of system information blocks; and
    receiving the part of the system information blocks from the network node.

2. The method according to claim 1, wherein the transmitting of the request comprises transmitting a preamble to indicate the part of the system information blocks.

3. The method according to claim 2, wherein the transmitting of the request comprises:
    selecting, from a plurality of preambles, a preamble associated with the part of the system information blocks; and
    transmitting the request to the network node, wherein the request includes the selected preamble.

4. The method according to claim 2, wherein the part of the system information blocks is indicated by transmission timing of the preamble.

5. The method according to claim 4, wherein the transmitting of the request comprises transmitting the request to the network node in accordance with a selected transmission timing associated with the part of the system information blocks.

6. The method according to claim 1, further comprising:
    receiving notification information from the network node, wherein transmission of the part of the system information blocks is predefined or derived based at least partly on the notification information.

7. The method according to claim 6, wherein the notification information is included in minimum system information.

8. The method according to claim 6, wherein the notification information indicates a correspondence between all of preambles and the plurality of system information blocks.

9. The method according to claim 1, wherein the feature of the part of the system information blocks comprises at least one of functionality and periodicity.

10. The method according to claim 1, further comprising:
receiving an indicator from the network node, wherein the indicator indicates at least one of: which system information blocks are being transmitted from the network node, and which system information blocks are scheduled to be transmitted from the network node.

11. The method according to claim 1, wherein the part of the system information blocks further comprises at least another system information blocks which are not requested by the user terminal.

12. An apparatus for requesting system information, comprising:
at least one processor; and
at least one memory comprising computer program code which, when executed by the at least one processor, cause the apparatus to:
transmit a request for a part of system information blocks among a plurality of system information blocks, to a network node, wherein the part of the system information blocks are grouped according to a feature of the plurality of system information blocks; and
receive the part of the system information blocks from the network node.

13. A method for transmission of system information, comprising:
receiving a request for a part of system information blocks among a plurality of system information blocks, from a user terminal to a network node, wherein the part of the system information blocks are grouped according to a feature of the plurality of system information blocks; and
transmitting the part of the system information blocks from the network node.

14. The method according to claim 13, wherein the receiving of the request comprises receiving a preamble for indicating the part of the system information blocks.

15. The method according to claim 14, wherein the receiving of the request comprises receiving the preamble which was selected from a plurality of preambles, and wherein the selected preamble is associated with the part of the system information blocks.

16. The method according to claim 14, wherein the part of the system information blocks is indicated by transmission timing of the preamble.

17. The method according to claim 16, wherein the receiving of the request comprises receiving the request from the user terminal in accordance with a selected transmission timing associated with the part of the system information blocks.

18. The method according to claim 13, further comprises:
transmitting notification information to the user terminal, wherein transmission of the part of the system information blocks is predefined or derived based at least partly on the notification information.

19. The method according to claim 18, wherein the notification information is included in minimum system information and wherein the notification information indicates a correspondence between all of preambles and the plurality of system information blocks.

20. An apparatus for transmission of system information, comprising:
at least one processor; and
at least one memory comprising computer program code which, when executed by the at least one processor, cause the apparatus to:
receive a request for a part of system information blocks among a plurality of system information blocks, from a user terminal, wherein the part of the system information blocks are grouped according to a feature of the plurality of system information blocks; and
transmit the part of the system information blocks.

* * * * *

UNITED STATES PATENT AND TRADEMARK OFFICE
CERTIFICATE OF CORRECTION

PATENT NO. : 10,880,816 B2  
APPLICATION NO. : 16/669436  
DATED : December 29, 2020  
INVENTOR(S) : Fan et al.

Page 1 of 1

It is certified that error appears in the above-identified patent and that said Letters Patent is hereby corrected as shown below:

On the Title Page

On Page 2, in Item (56), under "OTHER PUBLICATIONS", in Column 2, Line 2, delete "PCT/CN2017/10157," and insert -- PCT/CN2017/101576, --, therefor.

On Page 2, in Item (56), under "OTHER PUBLICATIONS", in Column 2, Lines 2-3, delete "dated Jul. 22, 2019, 4 pages." and insert -- dated Jul. 18, 2019, 6 pages. --, therefor.

In the Specification

In Column 1, Line 10, delete "2017," and insert -- 2017, now Pat. No. 10,512,027, --, therefor.

In Column 1, Line 27, delete "other SI" and insert -- other SI. --, therefor.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*